United States Patent
Kirshon et al.

(10) Patent No.: US 8,977,476 B2
(45) Date of Patent: Mar. 10, 2015

(54) AUTOMATIC SHUTDOWN SYSTEM FOR AUTOMOBILES

(75) Inventors: Michael W. Kirshon, Delray Beach, FL (US); Barry Kupferberg, Boca Raton, FL (US); Martin Schneider, Cabedelo (BR)

(73) Assignee: Safety Shutdown, LLC, Boca Raton, FL (US)

( * ) Notice: Subject to any disclaimer, the term of this patent is extended or adjusted under 35 U.S.C. 154(b) by 291 days.

(21) Appl. No.: 13/585,678

(22) Filed: Aug. 14, 2012

(65) Prior Publication Data

US 2012/0310515 A1 Dec. 6, 2012

Related U.S. Application Data

(63) Continuation-in-part of application No. 13/301,673, filed on Nov. 21, 2011, now abandoned.

(60) Provisional application No. 61/417,058, filed on Nov. 24, 2010.

(51) Int. Cl.
*F02D 28/00* (2006.01)
*F02N 11/08* (2006.01)

(52) U.S. Cl.
CPC ........ *F02N 11/0822* (2013.01); *F02N 11/0833* (2013.01); *F02N 2200/022* (2013.01); *F02N 2200/0801* (2013.01); *F02N 2200/0802* (2013.01); *F02N 2200/0803* (2013.01); *F02N 2200/101* (2013.01); *F02N 2200/102* (2013.01); *F02N 2200/106* (2013.01); *Y02T 10/48* (2013.01)
USPC .............................. 701/112; 701/32.1; 701/99

(58) Field of Classification Search
CPC ............ B60W 20/1082; F02D 41/042; G01N 33/004; G05B 9/00; G05B 9/02; G08B 21/00; G08B 21/02; G08B 21/04; G08B 21/0407; G08B 21/0415; G08B 21/12; G08B 21/14; F02N 11/0818; F02N 11/0822; F02N 11/0825; F02N 11/0833; F02N 11/0837; F02N 11/084
USPC .......... 701/32.1, 32.5, 88, 112; 180/271–273; 340/426.25
See application file for complete search history.

(56) References Cited

U.S. PATENT DOCUMENTS

| 3,780,311 A | 12/1973 | Brown |
| 4,221,206 A | 9/1980 | Haas |
| 4,371,051 A | 2/1983 | Achterholt |
| 5,199,396 A | 4/1993 | Shelef et al. |
| 5,199,397 A | 4/1993 | Shelef et al. |

(Continued)

*Primary Examiner* — Jerrah Edwards
(74) *Attorney, Agent, or Firm* — Klein, O'Neill & Singh, LLP

(57) ABSTRACT

A system for automatically shutting down an engine of a motor vehicle includes a plurality of status indicators, each providing status data in response to an operational parameter of the vehicle, wherein the status data from each of the status indicators has a predetermined status value. A controller is responsive to the status data and is configured to (1) sum the status values of the status data received by the controller to determine an aggregated status value, (2) compare the aggregated status value to a predetermined shutdown threshold value, and (3) provide a shutdown signal if the aggregated status value is at least equal to the shutdown threshold value for a predetermined time interval. An engine control unit in signal communication with the controller is operable to shut down the engine in response to the shutdown signal.

17 Claims, 5 Drawing Sheets

(56) References Cited

U.S. PATENT DOCUMENTS

| | | |
|---|---|---|
| 5,219,413 A | 6/1993 | Lineberger |
| 5,222,469 A | 6/1993 | Sutton |
| 5,285,523 A | 2/1994 | Takahashi |
| 5,333,703 A | 8/1994 | James et al. |
| 5,410,477 A | 4/1995 | Ishii et al. |
| 5,414,645 A | 5/1995 | Hirano |
| 6,057,755 A | 5/2000 | Phillips |
| 6,060,981 A | 5/2000 | Landes |
| 6,363,906 B1 | 4/2002 | Thompson et al. |
| 6,371,889 B1 | 4/2002 | Kuroda et al. |
| 6,577,909 B1 | 6/2003 | McGowan et al. |
| 6,996,969 B2 | 2/2006 | Dalton |
| 7,099,768 B2 | 8/2006 | Moriya |
| 7,110,877 B2 | 9/2006 | Ozeki et al. |
| 7,156,772 B2 | 1/2007 | Ohtaki et al. |
| 7,321,825 B2 | 1/2008 | Ranalli |
| 7,760,076 B2 | 7/2010 | Boggess |
| 7,791,454 B2 | 9/2010 | Egawa et al. |
| 7,796,021 B2 | 9/2010 | Saban |
| 8,044,782 B2 | 10/2011 | Saban |
| 2004/0055558 A1 | 3/2004 | McElroy |
| 2010/0174459 A1 | 7/2010 | Gibson et al. |
| 2010/0186711 A1 | 7/2010 | Speers et al. |
| 2010/0262357 A1 | 10/2010 | Dupuis et al. |

AUTOMATIC SHUTDOWN SYSTEM FOR AUTOMOBILES

CROSS-REFERENCE TO RELATED APPLICATIONS

This application is a Continuation-in-Part of U.S. application Ser. No. 13/301,673; filed Nov. 21, 2011 now abandoned, which claims priority under 35 U.S.C. §119(e) from U.S. provisional application Ser. No. 61/417,058; filed on Nov. 24, 2010. The disclosures of both prior-filed applications are hereby incorporated by reference in their entireties.

FEDERALLY SPONSORED RESEARCH OR DEVELOPMENT

Not Applicable

BACKGROUND

The present disclosure generally relates to a monitor and control system and respective method for determining when an idling vehicle engine can be creating a toxic environment, and for automatically disabling the engine in response to such determination.

Combustion engines discharge an exhaust that includes toxic gases, such as carbon monoxide. It is well known that elevated levels of carbon monoxide gases contained within a closed space can have harmful and even fatal effects on individuals exposed to higher concentrations thereof.

Numerous occurrences have been noted where residential occupants have succumbed to toxic exhaust gases discharged by a running vehicle engine, where the vehicle was parked within an attached garage. Several advancements in vehicle technology are aggravating the potential issue. For example, keyless engine control systems allow an operator to leave the vehicle while the engine remains running. Until recently, all vehicle engines would initiate operation by inserting a key into an ignition switch, whereby removing the key causes the engine to cease operating. The vehicle key would commonly be stored on a key ring used to hold a series of keys. The operator commonly uses other keys to access buildings, offices, desks, residence, etc. An operator who forgets to remove the keys from the vehicle would be reminded the next time a key stored on the same key ring would be needed. Furthermore, vehicle engines are now much quieter, making people less aware that the engine is running. In addition, vehicles now commonly include remote starters, where an individual can start a vehicle's engine remotely. This can occur by accidentally depressing the remote start button, thereby starting the vehicle engine unbeknownst to the individual.

A known solution integrates a carbon monoxide sensor into the vehicle. The carbon monoxide sensor may be located either within the vehicle or somewhere on the exterior of the vehicle. A monitoring system monitors the carbon monoxide sensor(s) and disables the engine when the sensor indicates an undesirable condition. This technology requires the integration of the carbon monoxide sensors, which introduces additional components, cost, and maintenance. Additionally, the technology relies upon the sensors to operate correctly. Each sensor needs to be monitored to ensure it is properly working. Externally located sensors are exposed to the operational conditions of the vehicle, such as being subjected to moisture, heat, cold, debris (such as dust, dirt, etc.), insects, etc. Each of these can alter the functionality of the carbon monoxide sensors.

Other solutions to the toxic exhaust gas problem involve monitoring or sensing operational parameters of the vehicle engine, and shutting off the ignition system or otherwise disabling the engine when certain operational parameters indicate a potentially dangerous level of toxic exhaust gas has been reached or is imminent. Such technology typically requires additional hardware, particularly electronic circuitry and wiring, creating additional costs that discourage its adoption. Further discouraging the use of such solutions are concerns that they may inadvertently cause an engine shutdown when a shutdown is not desired or needed, creating potential safety issues.

In view of the limitations of the prior art, a simpler, more economical, and more reliable solution is sought to the problem of managing the operation of a motor vehicle so as to provide for the shutdown of the vehicle's engine in response to sensed vehicle operational parameters that indicate the potential for a toxic exhaust gas build-up. More specifically, there has existed a longstanding need for a new and improved automotive toxic gas concentration governing system that monitors the vehicle for conditions that may result in the generation of toxic levels of exhaust gas, and that determines whether to disable the vehicle engine in response to those conditions.

Therefore, it would be advantageous to provide a monitor and control system that determines when an exhaust of an idling vehicle engine can be creating a toxic environment and that, subsequently, automatically disables the vehicle engine to cease the generation of the toxic exhaust gases. It would be additionally advantageous for the monitor and control system to minimize the possibility of an inappropriate engine shutdown, i.e., a shutdown that is not the result of the detection of a toxic environment.

SUMMARY

The present disclosure is generally directed to a vehicle status monitor and control system and respective method of use for automatically disabling the vehicle engine to cease the generation of the toxic exhaust gases.

One aspect of the present embodiments comprises a system for automatically shutting down an engine of a motor vehicle when a given set of conditions prevails. The system comprises a plurality of status indicators, each providing a status signal in response to an operational parameter of the vehicle, each of the status signals having a predetermined status value; a controller responsive to the status signals and configured to (1) sum the status values of the status signals received by the controller to determine an aggregated status value, (2) compare the aggregated status value to a predetermined shutdown threshold value, and (3) provide a shutdown signal if the aggregated status value is at least equal to the shutdown threshold value for a predetermined time period; and an engine control unit in signal communication with the controller and operable to shut down the engine in response to the shutdown signal.

In a particular embodiment, each sensor or status indicator (or its signal) is assigned a status value according to its importance in determining whether a shutdown condition is indicated, and an aggregate sensor value is calculated as the algebraic sum of the assigned status values. In accordance with this embodiment, the controller operates in accordance with a series of steps directed by the control system software to (a) query or receive the status of each sensor or status indicator; (b) calculate an aggregated status value; (c) determine whether the aggregated status value equals or exceeds a predetermined shutdown threshold value (i.e., the predetermined shutdown criterion); and (d) provide a signal to the engine control unit to disable the vehicle's engine when the predetermined shutdown threshold value prevails for the predetermined length of time T.

Another aspect of this disclosure is a method of ensuring that a decision to shut down a vehicle engine is based upon current sensor data. The method comprises (a) determining if data from a plurality of sensors or status indicators are current; (b) obtaining current data from a plurality of status indicators or sensors associated with the vehicle engine, if the data are not current; (c) parsing the current sensor or status indicator data; and (d) updating the data used to calculate the aggregated status value.

In yet another aspect, the vehicle status monitor and control system further comprises an override option, wherein the override option notifies a vehicle operator of a pending shutdown condition, and provides a predetermined shutdown delay interval for the operator to respond. Then, if an override is not indicated within the predetermined shutdown delay interval the system transmits a signal to the engine control unit to disable the vehicle's engine.

These and other aspects, features, and advantages of the present invention will become more readily apparent from the attached drawings and the detailed description of the preferred embodiments, which follow.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the disclosure. Hence, specific dimensions and other physical characteristics relating to the embodiments disclosed herein are not to be considered as limiting, unless expressly state otherwise.

The present embodiments provide systems and methods for disabling a vehicle engine when a potentially hazardous environment may be created in the vehicle's vicinity, such as by a buildup of poisonous exhaust gases. Another benefit of the present embodiments is conservation of fuel. When a condition exists where the vehicle may be causing an accumulation of toxic gases, the vehicle is also burning and wasting fuel. By terminating the operation of the engine, the present embodiments reduce excess fuel consumption.

Figure 1:
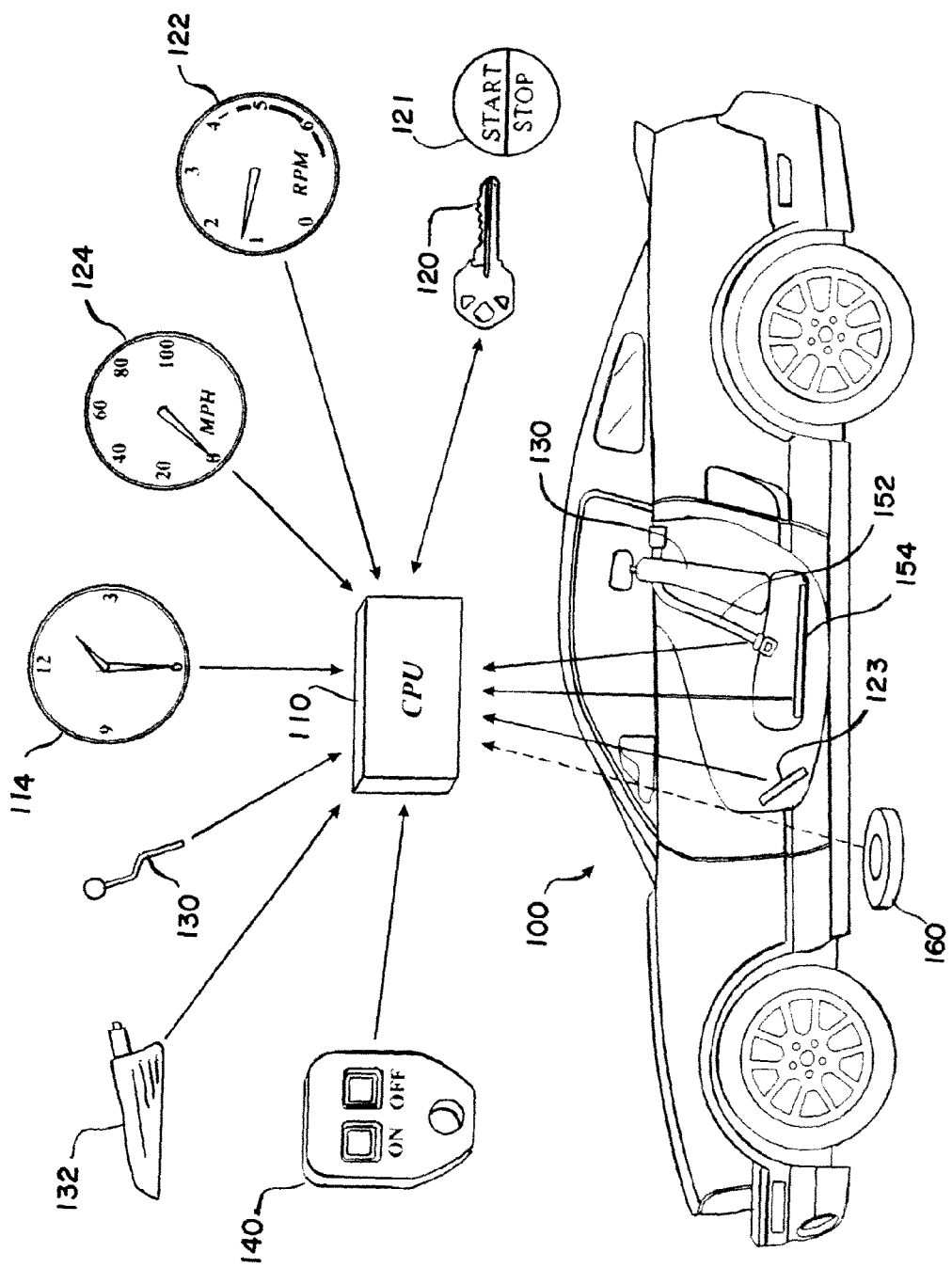
FIG. 1 is a schematic block diagram of a vehicle engine shut down system in accordance with an embodiment of this disclosure.
Figure 2:
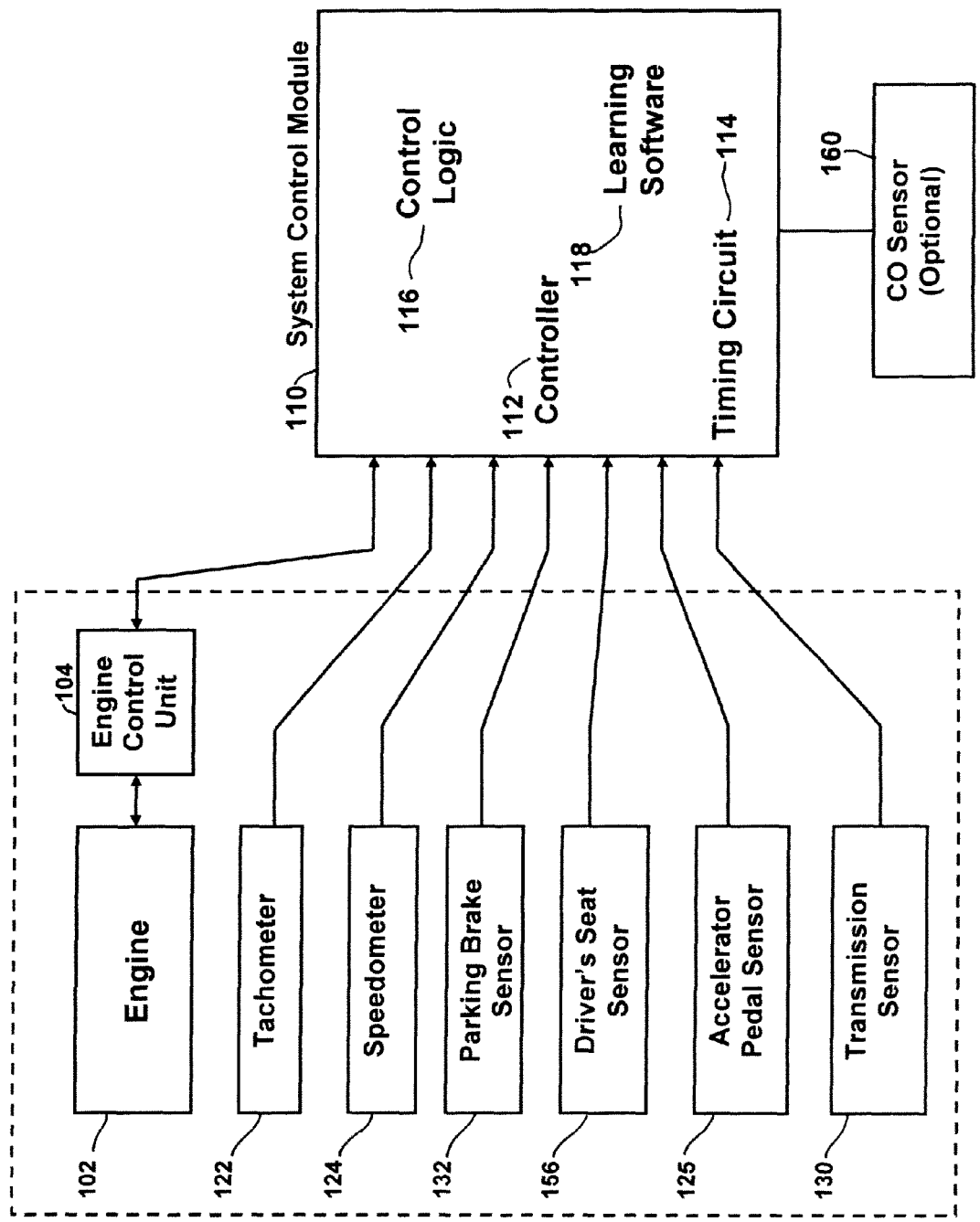
FIG. 2 is an functional schematic of the vehicle engine shut down system of FIG. 1.

An exemplary vehicle status monitor and control system integrates software with existing vehicle status sensing devices, with the various elements being illustrated in FIG. 1. A functional block diagram of the exemplary vehicle status monitor and control system is illustrated in FIG. 2. A vehicle 100 includes a vehicle engine 102, which is an internal combustion engine that discharges toxic exhaust gases when running. The toxic gases can accumulate within an enclosed environment in which the vehicle is located, creating a potentially hazardous environment for people and/or animals located therein. The present embodiments provide systems and methods for addressing this situation.

An ignition system of the vehicle is actuated by an actuation device, which may be a key 120 and/or an electronic start/stop button 121. The key 120 may be an electronic key that communicates with the vehicle with radio frequency (RF) signals, for example. With an electronic key, an operator may exit the vehicle with the key while the vehicle's engine remains running. Additionally, the operator may depress the start/stop button believing that the engine's operation has been terminated, but the engine may still be running. If the vehicle 100 is located in an enclosed environment, the exhaust accumulates, creating a hazardous environment.

A vehicle remote starter control 140 can be used to start the vehicle engine 102 remotely. The vehicle remote starter control 140 allows the operator to start the vehicle 100 remotely so that, for example, the engine may warm up and/or an interior temperature of the vehicle may be adjusted prior to driving. If the vehicle 100 is located in an enclosed environment when it is started remotely, the exhaust accumulates, creating a hazardous environment.

The vehicle status monitor and control system monitors various elements of the vehicle 100 to determine a potential risk of generation of a toxic concentration of exhaust gases. With continued reference to FIG. 1, a system control module 110 is integrated into the vehicle 100 to provide the overall controlling function of the system. An existing on-board computer may be adapted to include operational software and provide the functionality of the system control module 110, thus eliminating any requirement for additional hardware, while using the existing integrated original equipment manufacturer (OEM) sensor communication infrastructure. Alternatively, the system control module 110 may be configured as a separate processor dedicated to implementing the monitoring and control functions of the system. The system control module 110 is operatively associated with a data storage device (memory) 111, which may be either integral with the module 110, or a separate device.

Various monitored elements are provided in signal communication with the system control module 110. With reference to FIG. 2, the state of each sensor or status indicator is then monitored by a system controller 112, which may be a microcontroller, for example. The system controller 112 determines whether the state of the monitored sensors suggests a condition exists that can cause a potentially toxic accumulation of exhaust gases. When it is determined that a potential risk exists, the vehicle status monitor and control system may employ a controller logic sub-module 116 within the system control module 110 to terminate operation of the engine 102, by disabling, for example, the ignition system and/or the fuel delivery system. Learning software 118 may optionally be included in the system control module 110, which may adjust the predetermined settings established for such parameters as, e.g., the sensor signal values that suggest a potentially hazardous condition, the predetermined period of time that a potentially hazardous condition must exist for shutdown to occur, the shutdown delay interval for permitting a manual override (as described below), etc.

The system uses logic to determine if a condition exists that can cause a toxic accumulation of toxic gases. For example, in one embodiment, the logic determines if the engine is running and the vehicle is stationary over a period of time T, and an operator is not operating the vehicle. Under those conditions, there is a considerable risk of toxic gases accumulating and creating an unsafe environment.

With reference to FIGS. 1 and 2, in one embodiment, the engine 102 has an engine control unit 104 operatively connected to the ignition system 120 and the system control module 110. The engine 102 may have a sensor associated with it for monitoring a status of the engine 102. The vehicle 100 further includes a transmission, which is represented by and operated by a gearshift lever 130. The status of the vehicle engine 102 and gearshift lever 130 can indicate a stationary and idling condition.

The vehicle 100 commonly further comprises a parking brake 132. It is common, particularly for vehicles having a manual transmission, for the parking brake 132 to be engaged when the vehicle is parked. Thus, sensing a condition of the parking brake 132 provides an additional data point for determining if there is a potential danger of an accumulation of toxic gases. The ignition system 120 may include any component used to control the operation of the engine 102, such as, for example, an ignition switch (key operated, start/stop button, etc.), an ignition control module, a fuel flow controller, etc.

The vehicle 100 includes a series of operating status indicators that inform the operator of the operating conditions of the vehicle 100. These can include a tachometer 122, which informs the operator of the engine speed in revolutions per minute (RPM), and a speedometer 124, which informs the operator of the vehicle's speed. Each of the tachometer 122 and the speedometer 124 may have a sensor associated with it for monitoring a status of the engine 102. The vehicle 100 further includes an accelerator pedal 123, and an accelerator pedal position sensor 125 for sensing a position of the accelerator pedal 123, which can provide an indication of engine speed, which can in turn provide an indication of vehicle speed. Other engine speed sensors and/or processes can be used in addition to, or in place of the foregoing sensors and/or processes, including an engine idle sensor, an ignition timing sensor, etc. These operating status indicators provide additional data points conveyed to the system control module 110 and can be used for determining the potential risk of accumulation of toxic gases.

Another indicator of a potentially harmful condition is the status of the vehicle operator or driver. If the vehicle engine 102 is running and an operator is not sitting in the driver's seat 150, it is likely that the vehicle 100 is parked, and may be creating a hazardous environment. Whether or not the operator is present may be determined by monitoring a driver's seat status sensor 156 operatively associated with the driver's seat 150 The driver's seat status sensor 156 may be any of a variety of sensors integrated into or operatively connected to the driver's seat 150, including a monitor for the driver's seat belt 152, a driver's seat weight sensor 154, etc. Sensors of these types may be standard or optional equipment in modern vehicles.

A system timer 114 can be integrated into the system in any of a variety of means. The system timer 114 may be integrated into the system control module 110, or it may be provided remotely (such as a vehicle clock) and placed in signal communication with the system control module 110 using any signal communication interface. The system control module 110 uses the system timer 114 for determining a span of time associated with a status being monitored.

In certain embodiments, the system may include a toxic gas sensor 160. The toxic gas sensor 160 is placed in signal communication with the system control module 110. The preferred embodiment monitors the toxic gas sensor 160 is employed in parallel with the sensor logic described above to determine a potential for creating an unsafe environmental condition. The system control module 110 can alternatively use sensor logic to determine whether the vehicle is running or whether it is stationary. If it is stationary for a period of time T (determined by the timing circuit 114), the system will disengage the ignition of the vehicle engine 102, or interpret a signal from the toxic gas sensor 160 to determine if an unsafe level of toxic gas is present, and, if so, disengage the ignition of the vehicle engine 102. The system control module 110 can consider the status of the monitored sensors and the toxic gas sensor 160 independently or in combination.

It is understood that the various sensors discussed above and shown in FIGS. 1 and 2 are exemplary only. Various vehicles may lack one or more of these sensors, while other vehicles may include additional sensors besides those specifically mentioned herein.

Figure 3:
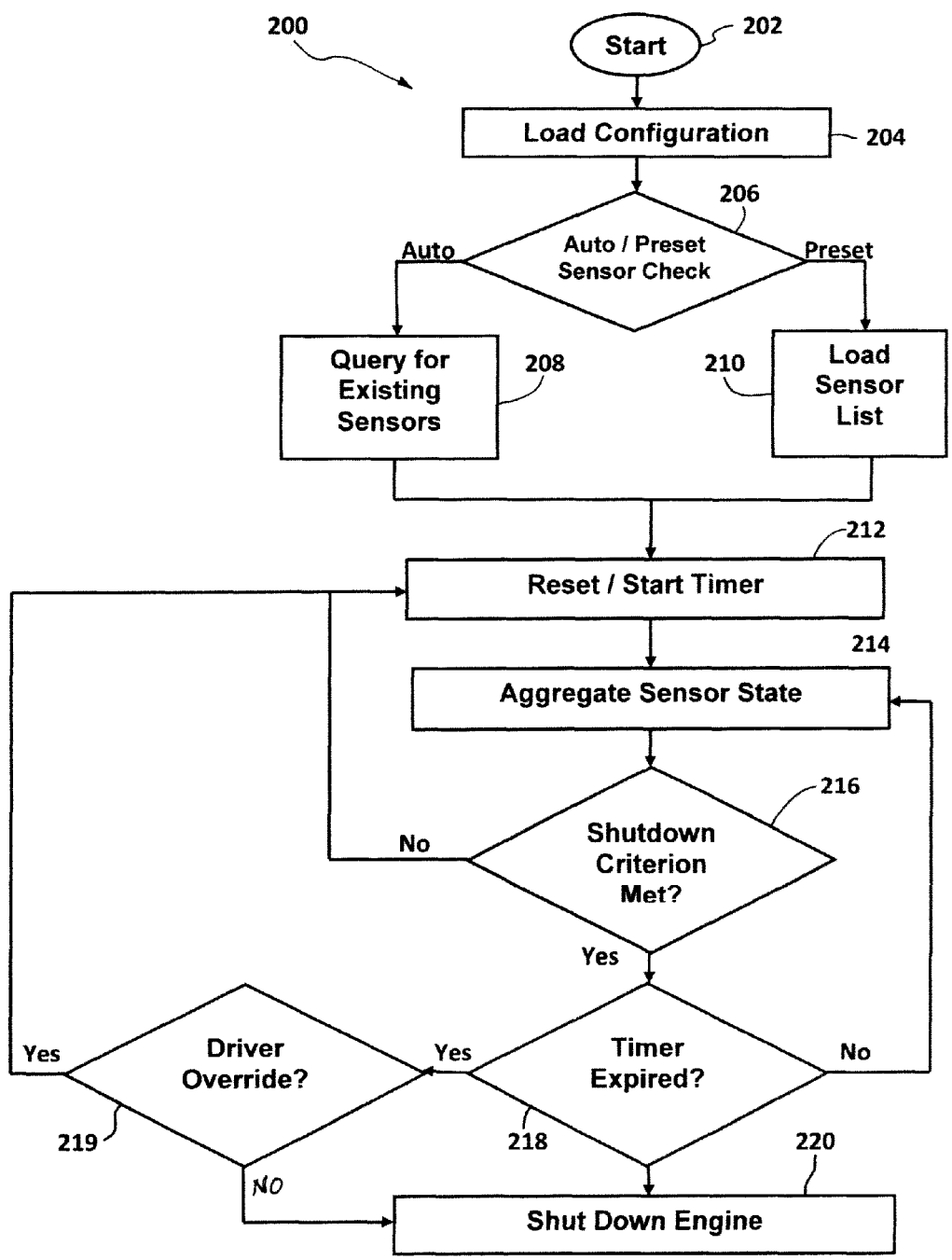
FIG. 3 is a high-level flow chart of the vehicle engine shutdown system in accordance with an embodiment of this disclosure.

FIG. 3 illustrates an example of a logic-based automatic shutdown overview flow chart 200 according to the present embodiments. The flow chart 200 presents a high level operational overview of a process associated with the vehicle status monitor and control system. The flow diagram 200 commences at step 202. The initiated system obtains a test configuration 204, wherein the system loads the test configuration from a source such as a memory (not shown) that is operatively associated with the system control module 110. The test configuration establishes the "weight" or relative value assigned to the status of each vehicle operation sensor or status indicator that may be queried (or from which a signal may be received), wherein the weight assigned to each sensor or status indicator (or its output signal) is a function of its importance in determining whether a shutdown condition is indicated. The test configuration also establishes a shutdown threshold value (STV), which is the minimum aggregated status value (ASV) that indicates a shutdown condition has been reached. The system control module 110 establishes a baseline of each of the monitored sensors in accordance with a sensor check step 206. Moreover, the system control module 110 may advantageously adjust the STV as a function of which sensors or status indicators respond positively (i.e., are deemed functional) to the sensor check step. Sensor or status indicator data may be obtained by any known means. For example, an automated process may scan all sensors connected to the system control module 110 (step 208). In another example, a predetermined sensor list is used to direct the system control module 110 to scan a specific set of sensors or status indicators (step 210). The determination is completed by considering both the state of the sensor or status indicator and a time period in which the sensor or status indicator remains in the identified state.

The monitoring process is initiated by starting a timer at $t_0$ in a start timer step 212. In parallel, the system determines the state of each monitored sensor or status indicator in accordance with an aggregate sensor state subroutine 214, the details of which are discussed below with reference to FIG. 4.

The aggregate sensor state subroutine 214 algebraically adds the weighted value of the status of each sensor or status indicator reporting its status to obtain an aggregated status value (ASV). The ASV is then compared to the STV at the comparison step 216. If the ASV is less than the shutdown threshold value (STV), a shutdown criterion is deemed unmet, the timer is reset to $t_0$, and the aggregate sensor state subroutine 214 is commenced again. If the ASV is equal to or greater than the STV, indicating that the shutdown criterion has been met, then the elapsed time since $t_0$ is measured to see if a predetermined time interval T has expired (step 218). The time interval T is advantageously selected to be a period of time that is long enough to avoid engine shutdown due to transient factors or spurious sensor signals, but short enough to assure that a shutdown is performed before a life-threatening concentration of toxic exhaust fumes has been generated. If the predetermined time interval T has not elapsed, the process returns to the aggregate sensor state subroutine 214. If the time interval T has elapsed, the process determines whether a driver override signal has been received at step 219, in accordance with the subroutine discussed below with reference to FIG. 5. If no driver override signal is received, the control module 110 signals the ECU 104 to shut down the engine (step 220). If a driver override signal has been received, the shutdown process is aborted, the system reinitiates the timer to $t_0$, and the aggregate sensor status subroutine 214 is commenced anew. Advantageously, each time the process cycles back to the aggregate sensor state routine 214, the sensor or status indicator status data used to calculated the ASV are updated with current status values in real time or near-real time. Thus, the ASV has been recalculated with current, updated status data before each comparison with the STV in step 216.

The system operating in accordance with the process shown in FIG. 3 may actuate the shutdown step 220 through any of a variety of mechanisms. In accordance with one embodiment, the vehicle's ignition system may be disabled. In another embodiment, the fuel delivery system (fuel pump and/or fuel injection system) may be disabled. Other disabling mechanisms may suggest themselves and are considered within the scope of this disclosure. The shutdown step may optionally include or initiate the activation of an audible or visible alarm (not shown).

Figure 4:
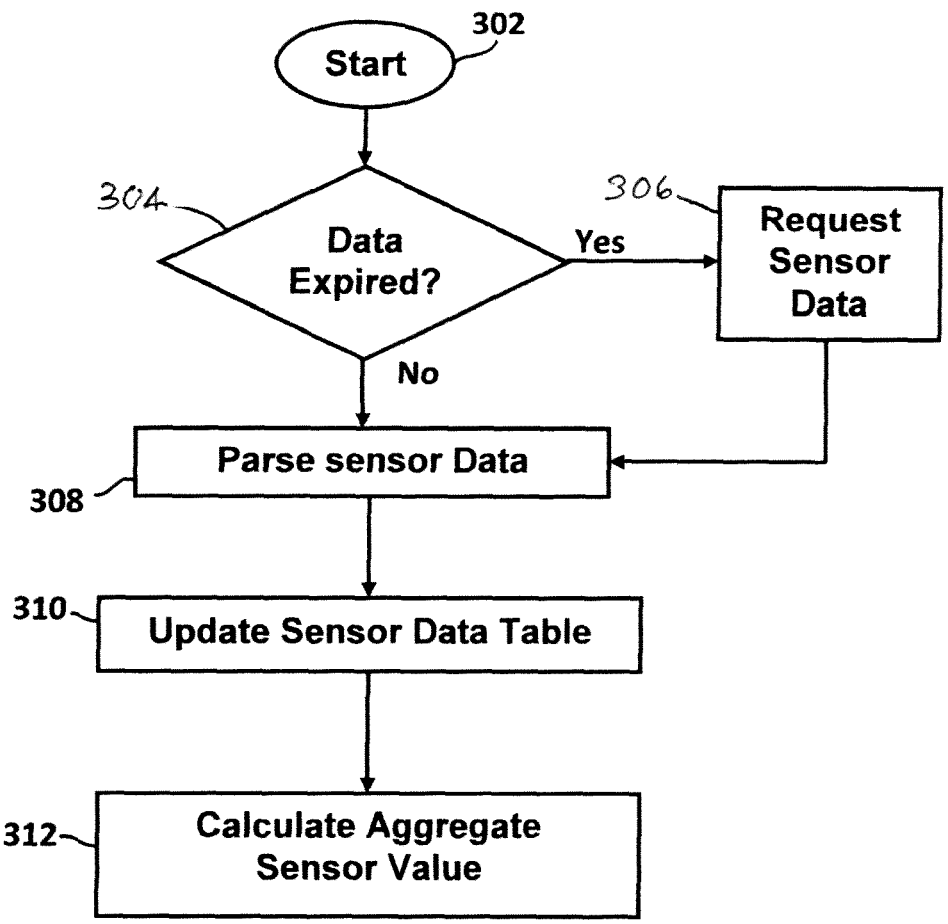
FIG. 4 is a flow chart of the aggregate sensor state process subroutine shown in FIG. 3.

The details of the aggregate sensor state subroutine 214 are shown in the flow chart of FIG. 4. Upon initiation (step 302), it is first determined whether data from the queried sensors or status indicators are "expired," i.e., whether a predetermined query time interval $T_Q$ has elapsed since the sensors or status indicators were previously queried (step 304). If $T_Q$ has expired, the sensors or status indicators are queried again to request updated status data (step 306). Once the system is satisfied that it has current, updated status data, the sensor/status indicator data are parsed (step 308) into data for each individual sensor or status indicator successfully queried (i.e., a sensor that is deemed functional), and the parsed sensor data are used to update a sensor data table (step 310) stored in the memory 111 operatively associated with the system control module 110. The data in the sensor data table are then used to calculate the ASV (step 312).

In its broadest aspect, the process described above and in FIGS. 3 and 4 may be understood as performing the following steps: (a) assigning a value $V_n$ to status data for each of n sensors or status indicators; (b) setting a timer to $t_0$; (c) receiving the status data; (d) summing all of the received status data values algebraically to yield the ASV; (e) determining if the ASV is greater than or equal to the STV for the predetermined time T; and (f) if the ASV is greater than or equal to the STV for T (assuming no driver override), shutting down the engine; otherwise, resetting the timer to $t_0$, receiving status data (updated if necessary), and repeating steps (d) through (f). The sensors/indicators may be queried (step 208) before the timer is initiated, or a list of sensors/indicators may be pre-loaded (step 210). A value of zero (0) may be assigned to any non-responsive or non-registering sensor/indicator, or to any sensor/indicator yielding faulty or erroneous data.

Figure 5:
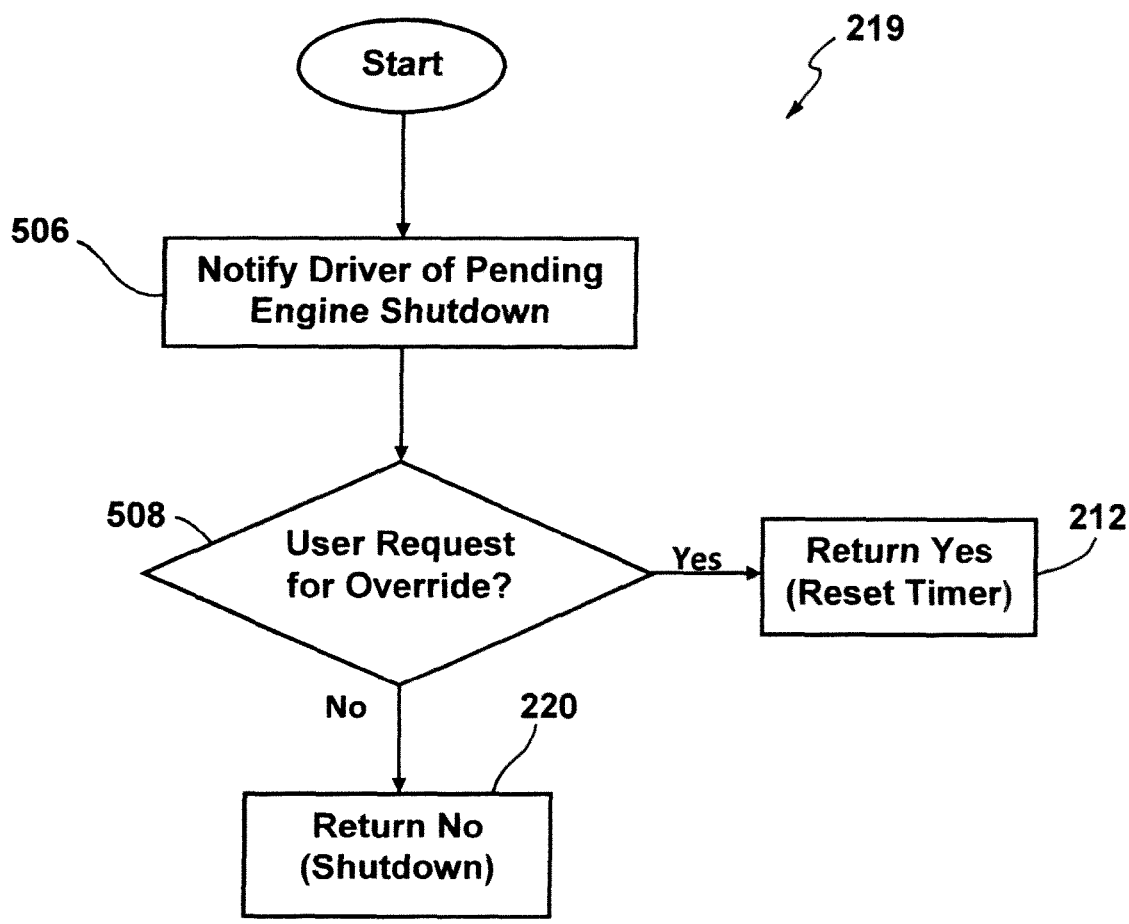
FIG. 5 is a flow chart of the driver override decision subroutine shown in FIG. 3.

The details of the driver override decision subroutine (step 219 in FIG. 4) are shown in the flowchart of FIG. 5. Once it is determined that the shutdown criterion has been met (step 216) and the time T has elapsed (step 218), the driver or operator is notified (e.g., by a warning light or audible alarm, not shown) that an engine shutdown is imminent (FIG. 5, step 506). Alternatively, this notification step 506 may be initiated a few seconds (e.g., 5-30 seconds) before the time T has elapsed, or even upon the determination that the shutdown criterion has been met, without regard to the elapsed time. After the notification step 506 is performed, the driver or operator ("user") is given a period of time (e.g., 5-30 seconds) in which to request an override (step 508) of the shutdown process. The override request 508 may be performed by the user actuating an override switch or the like (not shown) on the dashboard or console of the vehicle to generate an override signal. Alternatively, an override signal may be generated in response to the user turning off the warning light or alarm. If the system receives an override signal from the step 508, the system returns to the reset timer step 212 (FIG. 4). If the system receives no override signal, the system proceeds to engine shutdown (step 220). Of course, the user may react to the notification by manually turning off the ignition, which will effectively bring the system back to "START" (FIG. 4, step 202) the next time the engine is started.

The decision of determining whether the shutdown criterion has been met (FIG. 4, step 216) can be accomplished in any of a variety of ways. Each of the elements of the system, such as the driver's seat, the speedometer. etc. includes an associated sensor or electrical status indicator to provide an electrical indication representative of the state of the associated element. The sensor or status indicator is in signal communication with the system control module 110 via any suitable means, such as, for example, a hard-wired point-to-point connection, or a wireless communication system. Each sensor or status indicator signal is assigned a weight or value, depending on its relative importance in making the shutdown decision. For example, the status or signal indicating that the engine is running may be assigned a value of 1.0 (on a scale of −1.0 to +1.0), while the status or signal indicating that the driver's seat is occupied may be given a value of −0.5. In general, a status indicator or sensor signal that tends to indicate an unattended engine idle condition will be given a positive value or weight (because it contributes positively to a shutdown condition), while a status indicator or sensor signal that tends to indicate normal vehicle operation will be given a negative value (because it tends to negate a shutdown condition). Faulty or non-existent data from a sensor or status indicator is given a weight or value of zero (0).

Table 1, shown below, presents an exemplary list of sensors and status indicators that may be monitored by the system control module 110. The system assigns the status of each monitored operational parameter a weight or value, as described above, and then takes the algebraic sum of the weights or values to yield the ASV, which is then compared to the predetermined STV to determine whether the shutdown criterion is met.

TABLE 1

Engine Shutdown Sensor Decision Table

| Sensor/Indicator | | Status | |
| --- | --- | --- | --- |
| Value | Description | Anti-Shutdown | Pro-Shutdown |
| ±1.0 | Speedometer | >0 | =0 |
| ±1.0 | Tachometer | Not Idle | Idle |
| ±1.0 | Gear Shift | Not P or N | P or N |
| ±0.5 | Parking Brake | Released | Engaged |
| ±1.0 | CO-Sensor | CO Acceptable | CO Critical |
| ±0.25 | Seat Belt | Secured | Unsecured |
| ±0.5 | Driver's Seat | Weighted | No Weight |
| ±$V_n$ | nth sensor | Pass | Shutdown |

As mentioned above, the relative weight or value V assigned to each sensor or indicator may be positive if the indicated status contributes to positively to a shutdown condition ("Pro-Shutdown") and negative if it contributes negatively to a shutdown condition ("Anti-Shutdown"). It is understood that the assignment of positive and negative values to pro-shutdown signals and status indicators and anti-shutdown signals and status indicators may be reversed. Also, the values or weights may be on a scale of other than −1.0 to +1.0 (e.g. −5 to +5, −10 to +10, −100 to +100, depending on how "finely-tuned" the system is to be), and the relative value or weight assigned to each sensor or indicator may be varied in accordance with design considerations. Furthermore, the values of the time interval T and/or of the STV may be varied, depending on the type of vehicle, its expected mode of use, and any other considerations that may dictate the system's design and operational parameters. Finally, one or both of the time interval T and the STV may be adjustable in a particular vehicle depending expected operating conditions, changes in the operability or presence of particular sensors or status indicators, or other factors that might militate in favor of an operational adjustment. Thus, the system may be adjusted by changing operational parameters, rather than the entire algorithm.

The present embodiments may be directed to vehicles that use an electronic key and a start/stop push button to start and stop the engine. These vehicles use a communication system that interfaces to various system components such as the engine control unit (ECU) 104. Advantageously, the present embodiments do not require that any hardware be added to the vehicle. Certain of the present embodiments can be implemented as an algorithm executed on existing vehicle ECUs. The present embodiments do not need to rely on a specific set or combination of sensors or status indicators in order to operate properly. The present embodiments address issues of prior approaches, such as sensor failure, by using a generic approach of evaluating sensors and status indicators. The present embodiments do not need to be "hard coded" to a specific set of sensors or status indicators. The present embodiments can query a system for available sensors and indicators, and then base decision making on only the available inputs. The present embodiments can also recover from sensor failure. Should a sensor or indicator become inoperable, it is simply disregarded (assigned a value of zero) while the shutdown mechanism remains operational using only the remaining sensors and/or indicators. The present embodiments do not require exotic sensors. The present embodiments can be configured to rely only on sensors and indicators standard to modern vehicles. Although specialized sensors, such as carbon monoxide sensors, can be evaluated, they are not required in order to determine a shutdown situation.

While the above description presents several exemplary embodiments of the vehicle status monitor and control system in accordance with this disclosure, and of the manner and process of making and using it, the disclosed subject matter is susceptible to modifications and alternate constructions that are fully equivalent. Consequently, the scope of this disclosure is not limited to the particular embodiments disclosed. On the contrary, this disclosure should be deemed to embrace all modifications and alternate constructions coming within the spirit and scope of thereof, and as defined, for example, by the following claims.

What is claimed is:

1. A system for automatically shutting down an engine of a motor vehicle, comprising:
   a plurality of status indicators, each of the status indicators being configured to sense an operational parameter of the vehicle, and to provide status data in response to the sensed operational parameter of the vehicle, wherein the status data from each of the status indicators has a predetermined status value;
   a controller responsive to the status data and configured to (1) sum the status values of the status data received by the controller to determine an aggregated status value, (2) compare the aggregated status value to a predetermined shutdown threshold value, and (3) provide a shutdown signal if the aggregated status value is at least equal to the shutdown threshold value for a predetermined time interval; and
   an engine control unit in signal communication with the controller and operable to shut down the engine in response to the shutdown signal.

2. The system of claim 1, further comprising user-actuated means for generating an override signal, wherein the controller is further configured to abort the shutdown signal in response to the override signal.

3. The system of claim 1, further comprising a timer, wherein the controller is further configured to start the timer, prior to summing the status values, to measure an elapsed time until the expiration of the predetermined time interval, and to restart the timer if the aggregated status value is less than the shutdown threshold value within the predetermined time interval.

4. The system of claim 3, wherein the controller is further configured to receive updated status data when the timer is started.

5. The system of claim 2, further comprising a timer, wherein the controller is further configured to start the timer, prior to summing the status values, to measure an elapsed time until the expiration of the predetermined time interval, and to restart the timer either if the aggregated status value is less than the shutdown threshold value within the predetermined time interval, or in response to the override signal.

6. The system of claim 4, wherein the controller is further configured to request the updated status data if a predetermined query time interval has expired since last receiving the status data.

7. The system of claim 1, wherein the engine has an ignition system and a fuel delivery system, and wherein the controller is operable to transmit the shutdown signal to at least one of the ignition system and the fuel delivery system to shut down the engine.

8. The system of claim 1, wherein at least one of the predetermined time interval and the shutdown threshold value is adjustable.

9. The system of claim 1, wherein the shutdown threshold value is an aggregated status value that indicates an operational condition for the vehicle in which a toxic level of exhaust gas would be produced if the operational condition prevails for the predetermined time interval.

10. A method of automatically shutting down an engine of a motor vehicle having a plurality of status indicators, each of which provides status data for an operational parameter of the vehicle, the method comprising:
  (a) assigning a value to the status data for each of the status indicators;
  (b) setting a timer to $t_0$;
  (c) receiving the status data;
  (d) summing all of the received status data values algebraically to yield an aggregated status value;
  (e) determining if the aggregated status value is greater than or equal to a shutdown threshold value for a predetermined time interval; and
  (f) if the aggregated status value is greater than or equal to the shutdown threshold value for the predetermined time interval, initiating an engine shutdown process;
  (g) otherwise, resetting the timer to $t_0$ and repeating steps (c) through (f).

11. The method of claim 10, wherein, prior to the step of assigning a value, the method includes querying the status indicators, and wherein the step of assigning a value includes assigning a value of 0 to status data from a faulty or non-responsive status indicator.

12. The method of claim 10, wherein, after resetting the timer to $t_0$ in step (g) the receiving of status data in step (c) comprises:
  (c)(1) determining if a predetermined query time interval has elapsed since a previous reception of status data; and
  (c)(2) if the predetermined query time interval has elapsed since a previous reception of status data, requesting updated status data;
  otherwise, proceeding to step (d) without requesting updated status data.

13. The method of claim 10, wherein the received status data are stored in a data table prior to the step of summing, and wherein the receiving of status data comprises:
  (c)(1) parsing the received status data into data for each of the status indicators; and
  (c)(2) updating the data table with the parsed status data.

14. The method of claim 10, wherein the initiation of the engine shutdown process comprises:
  providing a period of time for reception of an override signal; and
  if the override signal is received within the period of time, shutting down the engine;
  otherwise, aborting the engine shutdown process and proceeding to step (g).

15. The method of claim 14, wherein the period of time for reception of an override signal is initiated by providing a warning signal to a user who is capable of causing the override signal to be generated.

16. The method of claim 10, wherein the vehicle has an ignition system and a fuel delivery system, and wherein the shutdown process includes disabling at least one of the ignition system and the fuel delivery system.

17. The method of claim 10, wherein the shutdown threshold value is an aggregated status value that indicates an operational condition for the vehicle in which a toxic level of exhaust gas would be produced if the operational condition prevails for the predetermined time interval.

* * * * *